(12) United States Patent
Dorrer

(10) Patent No.: US 7,133,135 B2
(45) Date of Patent: Nov. 7, 2006

(54) METHOD AND APPARATUS FOR THE DIRECT CHARACTERIZATION OF THE PHASE OF AN OPTICAL SIGNAL

(75) Inventor: Christophe J. Dorrer, Matawan, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 450 days.

(21) Appl. No.: 10/783,305

(22) Filed: Feb. 20, 2004

(65) Prior Publication Data
US 2005/0185187 A1    Aug. 25, 2005

(51) Int. Cl.
*G01B 9/02* (2006.01)
(52) U.S. Cl. .................... 356/450; 356/73.1
(58) Field of Classification Search ........... 356/73.1, 356/450, 451, 520
See application file for complete search history.

(56) References Cited

U.S. PATENT DOCUMENTS

| 5,530,544 A * | 6/1996 | Trebino et al. ............. 356/450 |
| 6,819,428 B1* | 11/2004 | Ogawa ...................... 356/450 |
| 7,042,629 B1* | 5/2006 | Doerr et al. ................ 359/325 |

OTHER PUBLICATIONS

Dorrer, et al., "Linear Optical Sampling", IEEE Photonics Technology Letters, vol. 15, No. 12, Dec. 2003, pp. 1746-1748.

* cited by examiner

*Primary Examiner*—Hwa (Andrew) Lee (57) ABSTRACT

A method and apparatus for the direct characterization of the phase of an optical signal includes measuring the interference between the optical signal and a sequence of optical pulses and processing the measured interference. The method and apparatus split and combine the optical signal and the sequence of optical pulses in order to measure the real and imaginary part of the interference signal for a least two pulses from the sequence of optical pulses. Processing steps are disclosed to obtain phase information on the optical signal from the measured interference.

22 Claims, 6 Drawing Sheets

METHOD AND APPARATUS FOR THE DIRECT CHARACTERIZATION OF THE PHASE OF AN OPTICAL SIGNAL

FIELD OF THE INVENTION

This invention relates to the field of the characterization of optical signals and, more specifically, to the direct characterization of the phase of optical signals.

BACKGROUND OF THE INVENTION

In optical communications systems, it is necessary to characterize the phase and amplitude of optical pulses as accurately as possible in order to predict and mitigate signal degradation. For example, in long distance wavelength-division multiplexed (WDM) systems, optical signals are modified by linear effects such as chromatic dispersion and polarization-mode dispersion, and nonlinear effects such as self-phase modulation or cross-phase modulation, all of which degrade their transmission properties. Characterizations of the effect of the distortions on a propagating optical signal can assist in determining corrective measures for an optical communications system. Another example of the necessity of having appropriate temporal diagnostics lies in the wide variety of modulation formats that are used for data transmission. Information bits are encoded in the amplitude or phase of short optical pulses, either in a binary fashion or with multiple levels of coding.

The temporal characterization of optical signals may be achieved by various means depending on the properties of the optical signal and the application. For example, one might be interested in measuring the electric field (temporal intensity and phase, or equivalently spectral intensity and phase) of a periodic train of pulses, from which information such as the duration or the chirp of the pulse (and more generally, the properties of the medium in which the pulse has traveled) may be deduced. In digital optical telecommunications where information is transmitted using optical pulses, a well-adapted characterization tool is the eye diagram, which consists of samples of the temporal intensity of a signal under test. A synchronous eye diagram therefore offers a statistical representation of allowable values for the temporal intensity of an optical signal. This information is extremely valuable in on-off keying systems since it represents the temporal shape of the pulses carrying the bits of information in the data stream and may be used to track various sources of noise and impairments. However, a conventional eye diagram only contains intensity information, and methods to measure such a representation do not have the ability to get any phase information. This is particularly detrimental for transmission systems based on phase-encoding, such as differential phase shift keying (DPSK), where the information is typically encoded in the phase difference between pulses in the data stream that have identical temporal intensity. The use of such phase encoding advantageously offers a relatively high degree of noise immunity while facilitating comparatively high data rates and is becoming common in telecommunication systems. As such, what is needed in the art is a method and apparatus for the direct characterization of the phase of phase-encoded signals.

SUMMARY OF THE INVENTION

The present invention solves the deficiencies of the prior art by providing a method and apparatus for providing phase statistical information based on coherent detection of the instantaneous value of the electric field of a source under test with a sequence of sampling pulses.

In one embodiment of the present invention, a method for the direct characterization of the phase of an optical signal includes measuring the interference between the optical signal and a sequence of sampling pulses. Additionally, the method includes processing steps to obtain phase information on the optical signal from the measured interference.

In another embodiment of the present invention, an apparatus for the direct characterizing of the phase of an optical signal includes an optical source delivering a sequence of sampling pulses and means of splitting and combining the optical signal with a sequence of sampling pulses to measure the interference of the optical signal with the sequence of sampling pulses. Additionally, the apparatus includes a phase characterization unit capable of performing processing steps on the measured interference to obtain phase information on the optical signal using the measured interference.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention advantageously provides a method and apparatus for the characterization of the phase of optical signals. Although various embodiments of the present invention are described herein with respect to the characterization of phase-encoded optical signals, the specific embodiments of the present invention should not be treated as limiting the scope of the invention. It will be appreciated by those skilled in the art informed by the teachings of the present invention that the concepts of the present invention may be advantageously applied to substantially any optical signal for the characterization of at least the phase of the optical signal.

The inventor discloses herein a method and apparatus for the direct characterization of the phase of an optical waveform under test based on the measurement of the interference of the waveform under test with a train of optical pulses and appropriate processing of the measured samples. In the development of the characterization method of the present invention, a waveform under test, represented by the electric field $E_D(t)$ is considered, where t is the temporal variable. A sampling source is also considered. Such a source delivers a substantially periodic train of optical pulses with a period, T. The pulses have limited temporal support (i.e., there is substantially no energy outside of a temporal window of width smaller than the period, T). Pulses from such a source typically have identical electric fields, with the exception of the presence of a phase component, $\phi_N$, which depends on the position of the pulse in the train. For example, pulse #N and the successive pulse #N+1 are substantially identical, except for a relative delay, T, and a relative phase difference $\phi_{N+1}-\phi_N$. The phase component describes the relative position of the envelope of the electric field (i.e. its slowly varying component) and the carrier of the electric field (i.e. its quickly varying component that has a period of the order of the optical cycle of the source, the inverse of the optical frequency). Such carrier-envelope phase offset and the fact that it is different for each pulse in the train of sampling pulses, may have various origins, depending on the implementation of the sampling source.

For example, in a mode-locked laser, the phase offset is linked to the difference between the group and phase velocities in the laser cavity. For the direct carving of a monochromatic source (i.e., when the sampling source is implemented using temporal modulation of a monochromatic source), the phase offset is linked to the ratio between the optical cycle of the monochromatic source and the period of the carving. In a favorable case for the implementation of this invention, the phase difference between successive sampling pulses is a constant (i.e., $\phi_{N+1}-\phi_N=\phi$, for all N). However, fluctuations of the phase of the sampling pulses in the train typically occur. Such fluctuations may be controlled but at the expense of complex and expensive experimental setups. Various processing techniques are herein provided in order to counteract the effect of these fluctuations on the phase measurement. The electric field of the pulse, #N, in the train of pulses, which is centered around time NT, may therefore be characterized as $E_S(t-NT)\exp(i\phi_N)$, where $E_S$ is the electric field that is common to all the sampling pulses. This enables the characterization of the electric field of the train of sampling pulses as the sum according to equation one (1), which follows:

$$\sum_N E_S(t-NT)\exp(i\varphi_N) \quad (1)$$

A quadrature of the interferometric component between $E_D(t)$ and the sampling pulse #N $E_S(t-nT)$ may be measured by coupling a signal from the source of the waveform under test and a signal from the sampling source and performing, in one embodiment of the present invention, balanced detection on the outputs. Such quantity may be characterized according to equation (2a), which follows:

$$S_{R,N}=Re[\int E_D(t) \cdot E^*_{S,N}(t-NT)dt \exp(-i\phi_N)]. \quad (2a)$$

Considering the source under test combined with the train of sampling pulses and incident on a slow integrating photodetector, the output electrical current of such detector corresponding to the pulse #N may be characterized according to equation (2b), which follows:

$$B_S+B_D+2Re[\int E_D(t) \cdot E^*_S(t-NT)dt \exp(-i\phi_N)], \quad (2b)$$

where $B_S$ and $B_D$ are background terms proportional to the average power of the sampling pulse and the data source, respectively. Note that these two quantities do not contain any phase information. Only the third term, the interferometric component, is of interest as it contains information about the relative phase of the source under test and the sampling pulse. The background may be a source of noise, for example, in the case of fluctuations in the energy of the sampling pulses. Preferably, only the phase-sensitive portion of the interference should be measured. The signal under test and the sampling signal are combined and subsequently split, sending each output to a separate detector. The difference of the signals of the detectors is then determined and is proportional to the quantity given by equation three (3), which follows:

$$Re[\int E_D(t) \cdot E^*_S(t-NT)dt \exp(-i\phi_N)]. \quad (3)$$

Figure 1:
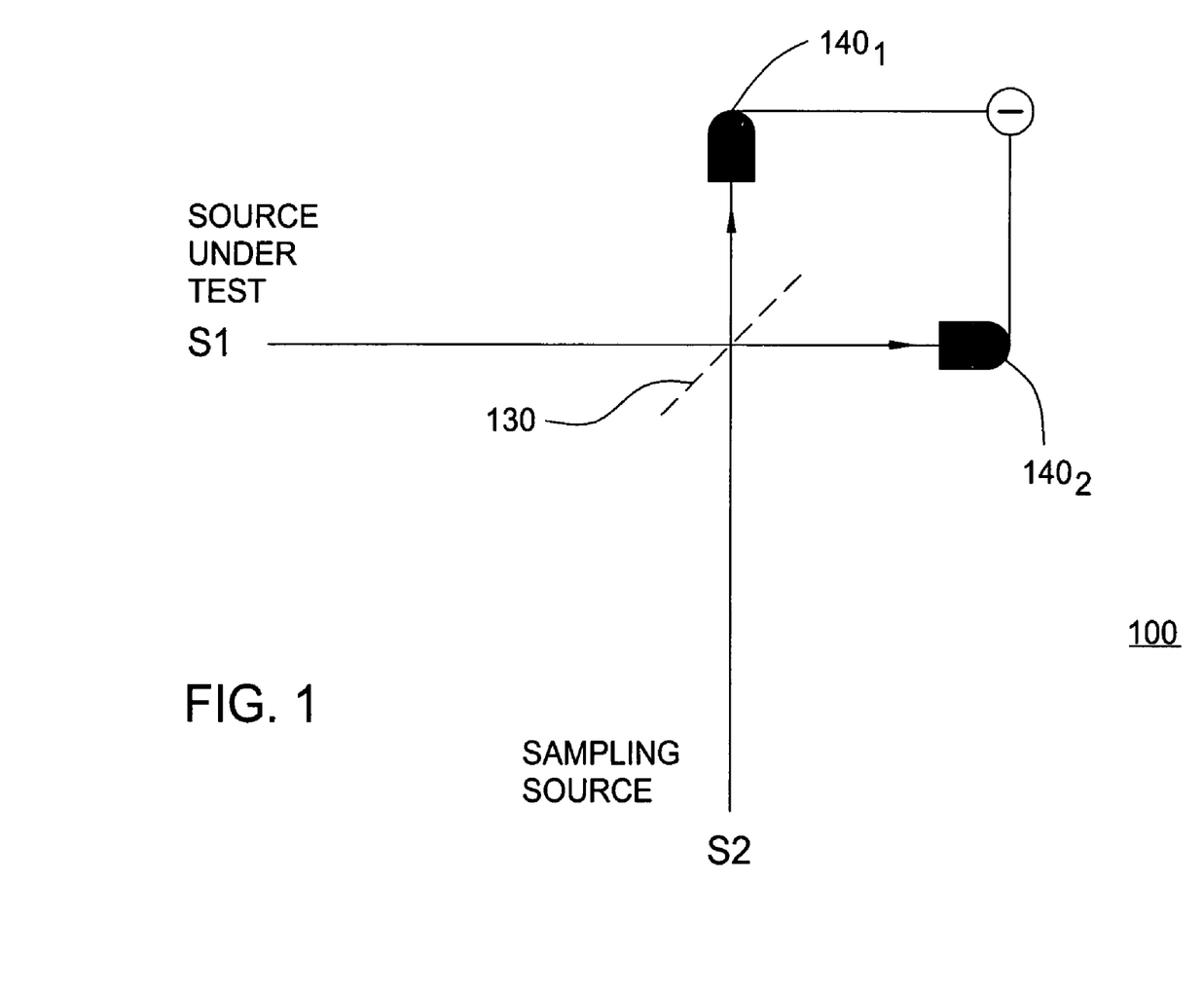
FIG. 1 depicts a high level block diagram of an embodiment of the detection method of the present invention.

FIG. 1 depicts a high level block diagram of an embodiment of the detection method of the present invention. FIG. 1 illustratively comprises a signal from a source under test S1, a signal from a sampling source S2, an optical beam splitter 130 and two photodetectors $140_1$, $140_2$. In the detection method 100 of FIG. 1, the signals from the source under test S1 and the sampling source S2 are combined and split by the optical beam splitter 130. Each of the components of the combined and split optical signals is then detected by one of the photodetectors $140_1$ and $140_2$. The difference between the outputs of the photodetectors is then determined. Although in FIG. 1, a signal from the source under test S1 and a signal from the sampling source S2 are illustratively combined and split by an optical beam splitter 130, other devices capable of combining and splitting the waveform under test and the sample waveform in accordance with the present invention, such as a 90-degree optical hybrid (described in further detail below with respect to an illustrated embodiment of a phase characterization device of the present invention), may replace the optical beam splitter depicted in FIG. 1. Furthermore, other detectors having substantially similar functions as the photodetectors of FIG. 1, such as optical channel monitors, may replace the photodetectors of the detection method 100 of FIG. 1.

The signal characterized by equation (3) above depends on the phase of the temporal cross correlation between the source under test and the sampling pulse. However, it is insufficient to the determination of the phase of the source under test since it depends directly on the unknown quantity $\phi_N$. In order to isolate the phase dependence, a simultaneous measurement of both quadratures for each sampling event (i.e., the real and imaginary parts of the interferometric component) is performed. This is preferably accomplished in one embodiment by using at least two setups that are substantially similar to the combining and splitting setup depicted in FIG. 1 above, and introducing a $\pi/2$ phase shift between the fields in the second setup. For example, FIG. 2 depicts a high-level block diagram of the simultaneous measurement of both the real and imaginary quadratures for each sampling event in accordance with an embodiment of the present invention.

Figure 2:
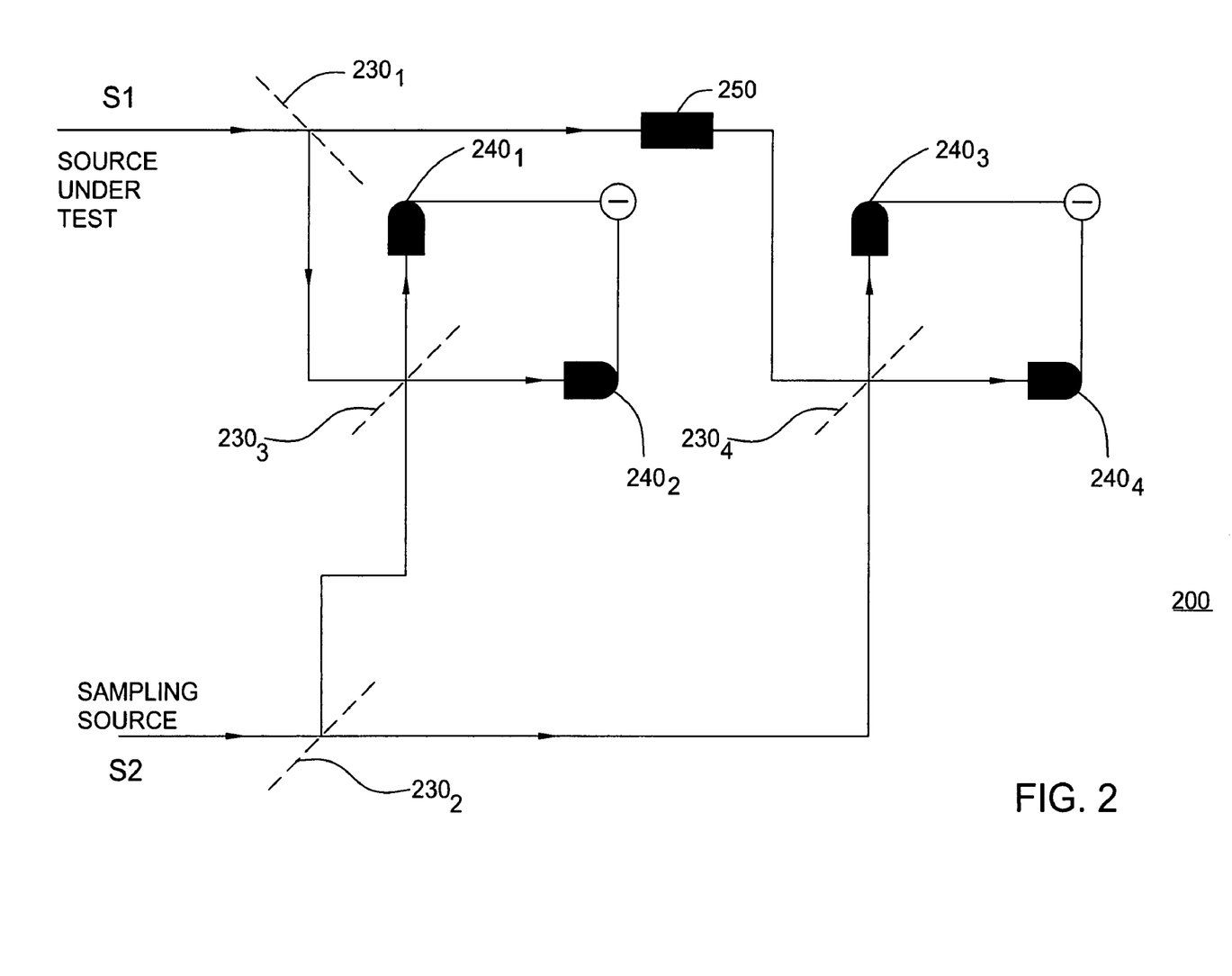
FIG. 2 depicts a high level block diagram of the simultaneous measurement of both, a real and an imaginary quadrature, for each sampling event in accordance with an embodiment of the present invention.

FIG. 2 illustratively comprises a signal from a source under test S1, a signal from a sampling source S2, four optical beam splitters $230_1$–$230_4$, four photodetectors $240_1$–$240_4$ and an optical phase shifter 250. In the detection method 200 of FIG. 2, the signals from the source under test S1 and the sampling source S2 are each split into two optical paths by the first two beam splitters, 230₁ and 230₂, respectively. In the first optical path, a first portion of the signal from the source under test S1 and the signal from the sampling source S2 are combined and split by the optical beam splitter 230₃. As in the detection method 100 of FIG. 1, each of the components of the combined and split optical signals is then detected by one of the photodetectors 240₁ and 240₂. The difference between the outputs of the photodetectors is then determined.

In the second optical path, the signal from the source under test S1 experiences a $\pi/2$ phase shift in the phase shifter 250. A second portion of the signal from the source under test S1 and the signal from the sampling source S2 are combined and split by the optical beam splitter 230₄. Each of the components of the combined and split optical signals in this second quadrature is then detected by one of the photodetectors 240₃ and 240₄. The difference between the outputs of the photodetectors 240₃, 240₄ is then determined. Although in FIG. 2, the signal from the source under test and the signal from the sampling source are illustratively combined and split for both quadratures by optical beam splitters, other devices capable of combining and splitting the waveform under test and the sample waveform in accordance with the present invention, such as a 90-degree optical hybrid (described in further detail below with respect to an illustrated embodiment of a phase characterization device of the present invention), may replace the optical beam splitters depicted in FIG. 2. It will be appreciated by those skilled in the art that the phase shifter introduces a relative phase shift in the phase difference between the two sources recombined by the combiner 230₃ compared to the two sources recombined by the combiner 230₄. As such, although the phase shifter is illustrated in the bath between 230₁ and 230₄ in FIG. 2, it may be located in any of the four optical paths between the splitters, namely 230₁ and 230₂ of FIG. 2, and the combiners, namely 230₃ and 230₄. It should also be appreciated that the requirement on the relative phase shift between the two sources recombined by the combiner 230₃ compared to the two sources recombined by the combiner 230₄ equal to $\pi/2$ may be implemented by other means with the absence of the controllable phase shifter 250.

The orthogonal quadrature (i.e., the imaginary part) determined, for example by the detection method 200 of FIG. 2, may be characterized according to equation (4a), which follows:

$$S_{I,N} = Im[\int E_D(t) \cdot E^*_{S,N}(t-NT)dt \, \exp(-i\phi_N)]. \quad (4a)$$

As depicted in FIG. 2 above, for the imaginary quadrature, the waveform under test and the sampling waveform are combined and subsequently split, sending each output to a separate detector. The difference of the detectors is then determined and is proportional to the quantity given by equation (4b), which follows:

$$Im[\int E_D(t) \cdot E^*_{S,N}(t-NT)dt \, \exp(-i\phi_N)]. \quad (4b)$$

The two samples depicted by equations (3) and (4b), above are combined and may be characterized by equation five (5), which follows:

$$S_N = S_{R,N} + iS_{I,N} = \int E_D(t) \cdot E^*_{S,N}(t-NT)dt \, \exp(-i\phi_N). \quad (5)$$

Rewriting $S_N$ according to equation six (6), which follows:

$$S_N = \int \tilde{E}_D(\omega) \cdot \tilde{E}^*_{S,N}(\omega) \cdot \exp(iN\omega T)d\omega \, \exp(-i\phi_N), \quad (6)$$

makes it clear that a sampling pulse with flat spectral density and phase leads to the characterization of equation (6) above according to equation seven (7), which follows:

$$S_N = \int \tilde{E}_D(\omega) \cdot \exp(iN\omega T)d\omega \cdot \exp(-i\phi_N), \quad (7)$$

Therefore, the samples may be characterized according to equation eight (8), which follows:

$$S_N = E_D(nT) \cdot \exp(-i\phi_N). \quad (8)$$

Equation (8) above depicts a best case scenario characterization of the optical signals (i.e., flat spectral density and phase of the sampling pulse over the spectral support of the source under test). However, this is not exactly the case in practice and it will be appreciated by those skilled in the art that the samples given by equations (5) and (6) above still contain relative phase information between the two sources. A typical example is that in DPSK, the data pulses are substantially identical excepted for phase shifts. Therefore, the electric field, $E_D$, has a phase that takes essentially discrete values, and the samples $S_N$ take essentially the same discrete values, although they are not exactly equal to $E_D$. Therefore statistical information on the phase of the source under test can be obtained using the samples given by equation (5), even in the non-optimal case where these samples cannot be characterized according to equation (8).

As depicted by the progression of equations (1) through (8) above, the measured samples directly depend on the phase of the electric field of the source under test and the phase of the sampling pulses. Because the latter is a quantity fluctuating in a non-trivial and non-controlled manner, various mathematical operations may be performed in order to obtain relevant information of the source under test. Preferentially, for each sampling event (for which the two quadratures have been measured), a complex number is calculated using the measured real part and imaginary part given by, for example in one embodiment of the present invention, the two balanced detectors as depicted in equation (5), above. The phase information about the source under test is contained in such a complex number, such that a statistical representation of the temporal phase of the source may be obtained from a set of measured complex numbers and preferentially from the phase of these samples.

Figure 3:
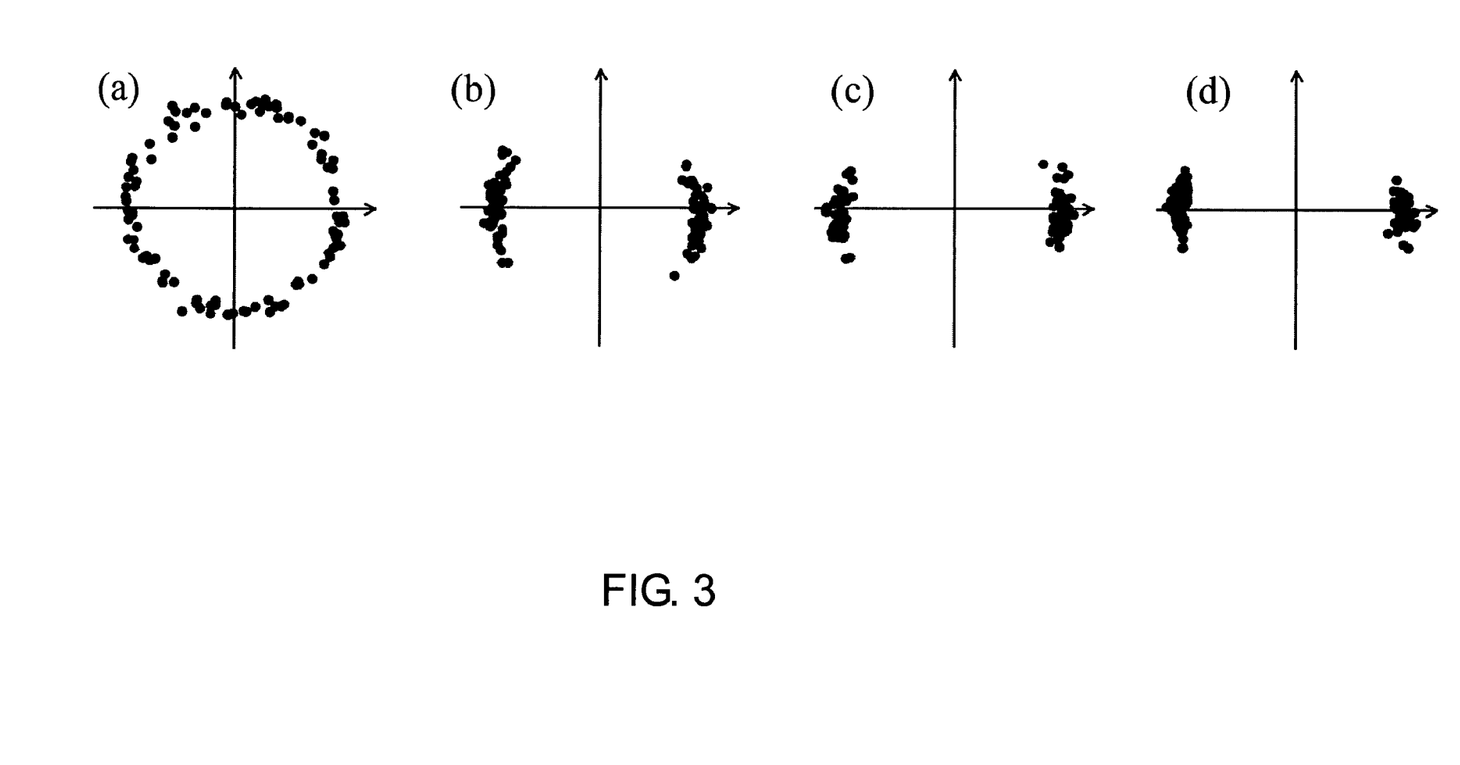
FIGS. 3a–3d graphically depict a plot of the complex plane representation of samples for the characterization method of the present invention.

In practice, however, the phase of the sampling pulses, $\phi_N$, makes the samples $S_N$ of little use if used directly. For example, FIG. 3a graphically depicts a complex plane representation of the samples, $S_N$, of equation (5) for a DSPK signal. As seen in FIG. 3a, the samples are gathered around a circle and no clear phase relation between the samples of the source under test is obtained. It must therefore be considered that a single sample according to equation (5), because of the dependence on $\phi_N$, is of substantially no use for the determination of the phase properties of the source under test. Additionally, a set of samples $S_N$, if considered separately, is of substantially no use for the determination of the phase properties of the source under test. In accordance with the concepts of the present invention, various processing operations on the phase of the measured samples may be performed to obtain relevant phase information of the source signal by considering sets of successive samples.

For example, in one embodiment of the present invention, a more useful representation is obtained by calculating samples, $\Sigma_N$, that have a modulus substantially identical to the modulus of the samples $S_N$, but have a phase calculated as the phase difference between two successive samples (i.e., the difference between the phase of samples $S_{N+1}$ and $S_N$).

This has the effect of canceling most of the effects of the envelope-carrier offset of the source and sampling pulses. Indeed, for the case when the relative phase between successive samples is a constant (i.e., $\phi_{N+1}-\phi_N=\phi$) the samples $\Sigma_N$ directly represent the relative phase levels of the source under test. For example, the samples, $\Sigma_N$, obtained from the samples, $S_N$, plotted on FIG. 3a are plotted on FIG. 3b. As evident from FIG. 3b, two relative phase levels separated by $\pi$ are present since the samples gather around two points oppositely located in the complex plane. However the drift in the relative phase between successive sampling pulses tends to broaden the two phase levels. Such broadening can be removed by additional processing.

In further processing, a slowly varying component in the phase of the samples, $\Sigma_N$, is removed. This operation is performed in order to remove a slow drift present in the relative phase between successive sampling pulses. Such removal, in one embodiment of the present invention, is performed in the following manner. First, a subset of the samples corresponding to a given phase level (e.g., the samples on one side of the plot of FIG. 3b) are isolated. A polynomial, or more generally a slowly varying function, is then fitted to the phase of these samples in order to determine the drift in the phase difference, $\phi_{N+1}-\phi_N$. The determined function is then subtracted from the phase of all of the samples. For example, FIG. 3c graphically depicts a plot of the samples, $\Sigma_N'$, after the removal of the determined function. As can be seen in FIG. 3c, a new complex plane representation is obtained by considering the samples, $\Sigma_N$, after the removal of the polynomial. In FIG. 3c, the spread of the phase levels of the samples has been reduced.

In further processing, a recalculation of the samples of the initial waveform (i.e., the samples that directly relate to the phase of the source under test and not to the relative phase between two different samples of the source under test) is performed. Such a recalculation may be necessary when the source under test comprises more than two phase levels. This also has the effect of reducing the noise in the complex representations. That is, the samples $\Sigma_N$ and $\Sigma_N'$ combine two measured samples (and therefore their noise) and are therefore more noisy. As such, the phase of the samples $\Sigma_N'$ may be concatenated to obtain new phase samples which may be combined with the modulus of the initial samples $S_N$ in order to provide a new representation of the data source $S_N'$. It will be appreciated by those skilled in the art informed by the teachings of the present invention that such concatenation operation from the phase of the samples, $\Sigma_N'$, to the phase of the samples, $S_N'$, is the inverse operation of the differentiation operation from the phase of the samples $S_N$ to the phase of the samples $\Sigma_N$. These new samples are depicted in FIG. 3d. As expected for DPSK signal and as depicted in FIG. 3d, two phase levels separated by $\pi$ are still present, but the measurement noise is smaller than on FIGS. 3a, 3b and 3c, as evidenced by the reduced spread of the data points.

By combining the samples measured in accordance with the present invention, considering their phase difference and various processing operations, for example the subtraction of a polynomial, various representations of the phase levels that are present in the encoded source under test may be obtained. More generally, any linear or nonlinear function of an arbitrary number of the measured samples may be considered in order to obtain phase information regarding the source under test. This includes for example considering a subset of the measured samples, combining their phase in order to obtain information on the source under test or determining a slowly varying function representative of the phase of the pulses from the sequence of sampling pulses.

Figure 4:
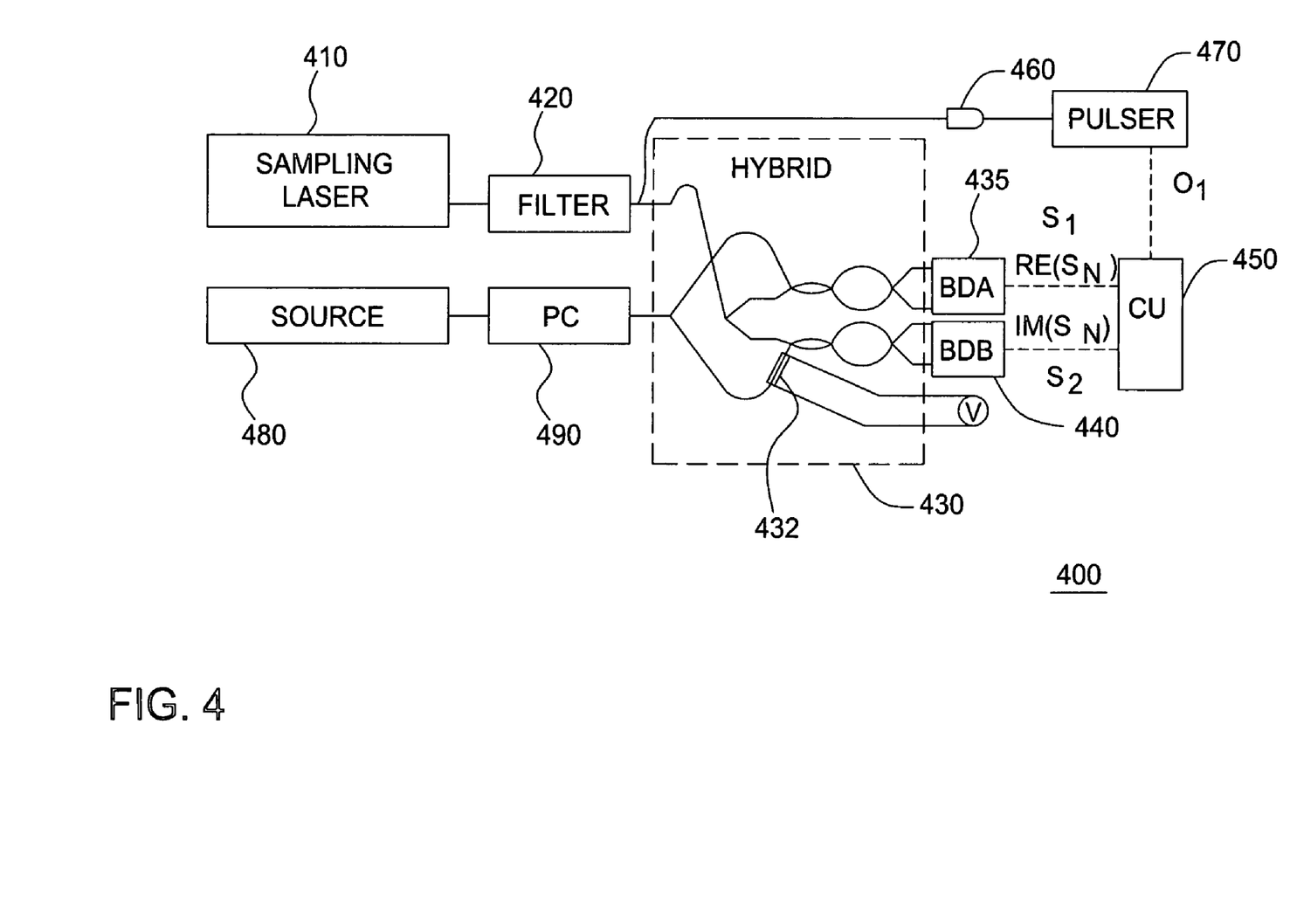
FIG. 4 depicts a high level block diagram of an embodiment of a phase characterization device in accordance with the present invention.

FIG. 4 depicts a high-level block diagram of an embodiment of a phase characterization device in accordance with the present invention. The phase characterization device 400 of FIG. 4 comprises a sampling source (illustratively a 10-MHz mode-locked fiber laser) 410, an optional optical filter 420, a 90-degree hybrid coupler 430, two balanced optical detectors 435 and 440, a phase characterization unit 450, an optional photodiode 460, and an optional pulser 470. The 90-degree hybrid 430 of the phase characterization device 400 further comprises a phase shifter (illustratively a thermo-optic phase shifter) 432. FIG. 4 further depicts a source under test 480. Although the phase characterization device 400 of FIG. 4 illustratively depicts a 90-degree hybrid coupler for performing the combining and splitting of the optical source under test and the sampling signal in accordance with the concepts of the present invention, other means for accomplishing the combining and splitting of the optical source under test and the sampling signal of the present invention, such as disclosed above with respect to FIG. 1 and FIG. 2, may be implemented in various other embodiments of the present invention. In addition, although the phase characterization device 400 of FIG. 4 illustratively depicts two balanced detectors for performing the measurements of the present invention, other means, such as disclosed above with respect to FIG. 1 and FIG. 2, may be implemented for performing the measurements of the present invention in various other embodiments of the present invention. For example, the phase characterization unit could measure the outputs of the four detectors leading to the quantities depicted by equation (2b) above and calculate the two differences leading to the real and imaginary part depicted by equations (2a) and (4a) above.

In the phase characterization device 400, the train of sampling pulses is obtained from the 10 MHz passively mode-locked sampling laser 410, which output may be spectrally filtered by the optional optical filter 420 in order to match the spectral density of the source under test 480. The optical hybrid 430 accepts a signal from each of the two sources 410, 480 as two inputs, and combines them as four outputs. In the optical hybrid 430, one of the split optical signals from the source under test 480 is phase shifted by $\pi/2$ using the voltage controlled thermo-optic phase shifter 432, such that the imaginary part of the combined optical signals may be measured, as described above with respect to FIG. 2. Balanced detection is then performed on the two pairs of outputs with the balanced detectors 435, 440. Each of the outputs of the balanced detectors 435, 440 is communicated to the phase characterization unit 450. In the phase characterization unit 450, the received signals from the balanced detectors 435, 440 are sampled at a rate that is synchronized to the 10 MHz sampling events. This sampling by the phase characterization unit 450 may be locked to the rate of the sampling laser using the optional slow photodiode 460 and pulser 470. More specifically, a portion of the signal from the sample source 410 is split and directed to a path including the slow photodiode 460 and the pulser 470, which are used to synchronize the sampling of the phase characterization unit 450 to the sampling laser 410. The phase characterization unit 450 receives the signals from the balanced detectors 430, 435 regarding the two quadratures of the interference signal and determines the complex interference signal of equation (5), above. The phase of successive samples may then be combined in order to remove the sensitivity to the carrier-phase offset as explained previously. More specifically, the phase characterization unit 450 of the present invention determines the phase characteristics of the source under test 480 as described above.

Figure 5:
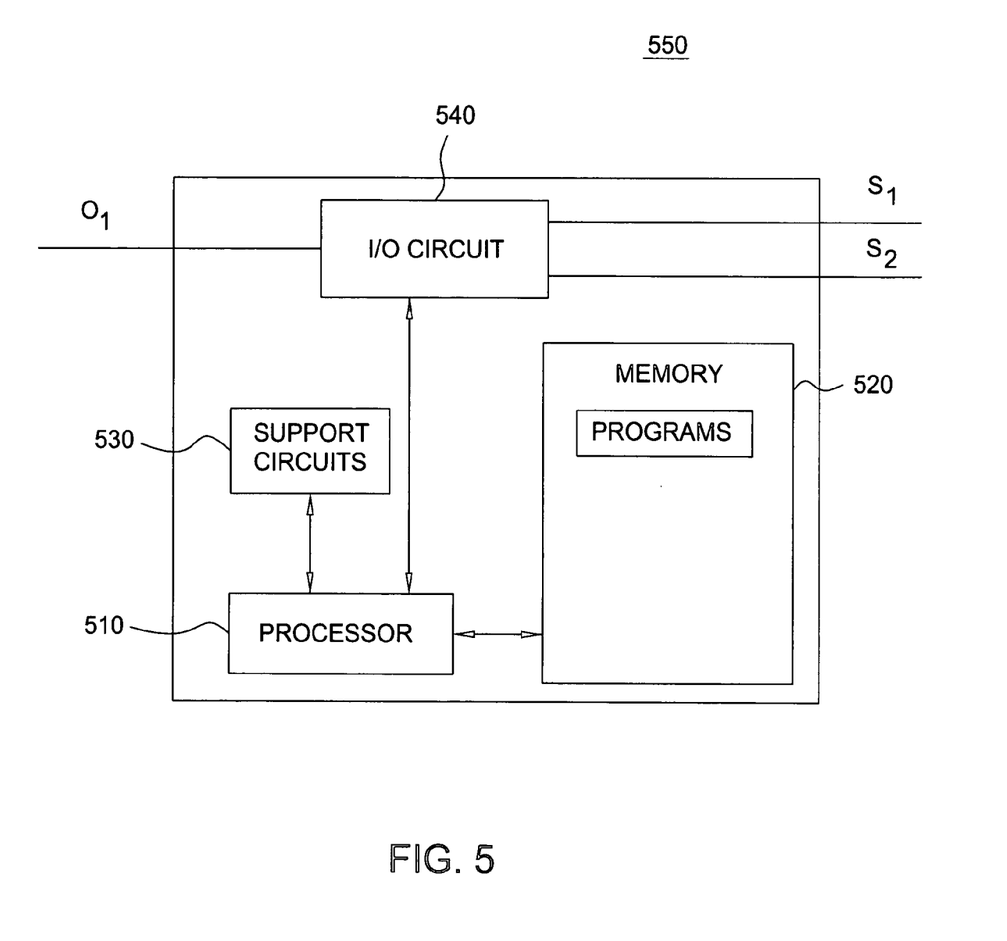
FIG. 5 depicts a high level block diagram of a phase characterization unit of the present invention suitable for use in the phase characterization device of FIG. 1.

FIG. 5 depicts a high level block diagram of a phase characterization unit 450 of the present invention suitable for use in the phase characterization device 400 of FIG. 4. The phase characterization unit 450 of FIG. 5 comprises a processor 510 as well as a memory 520 for storing the algorithms and programs. The processor 510 cooperates with conventional support circuitry 530 such as power supplies, clock circuits, cache memory and the like as well as circuits that assist in executing the software routines stored in the memory 520. As such, it is contemplated that some of the process steps discussed herein as software processes may be implemented within hardware, for example, as circuitry that cooperates with the processor 510 to perform various steps. The phase characterization unit 450 also contains input-output circuitry 540 that forms an interface between the various functional elements communicating with the phase characterization unit 450. For example, in the embodiment of FIG. 5, the phase characterization unit 450 communicates with one of the balanced detectors 535 via a signal path S1 and to the second balanced detector 540 via a signal path S2. The phase characterization unit 550 further communicates with an optional pulser 570 via a signal path O1.

Although the phase characterization unit 450 of FIG. 5 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

Figure 6:
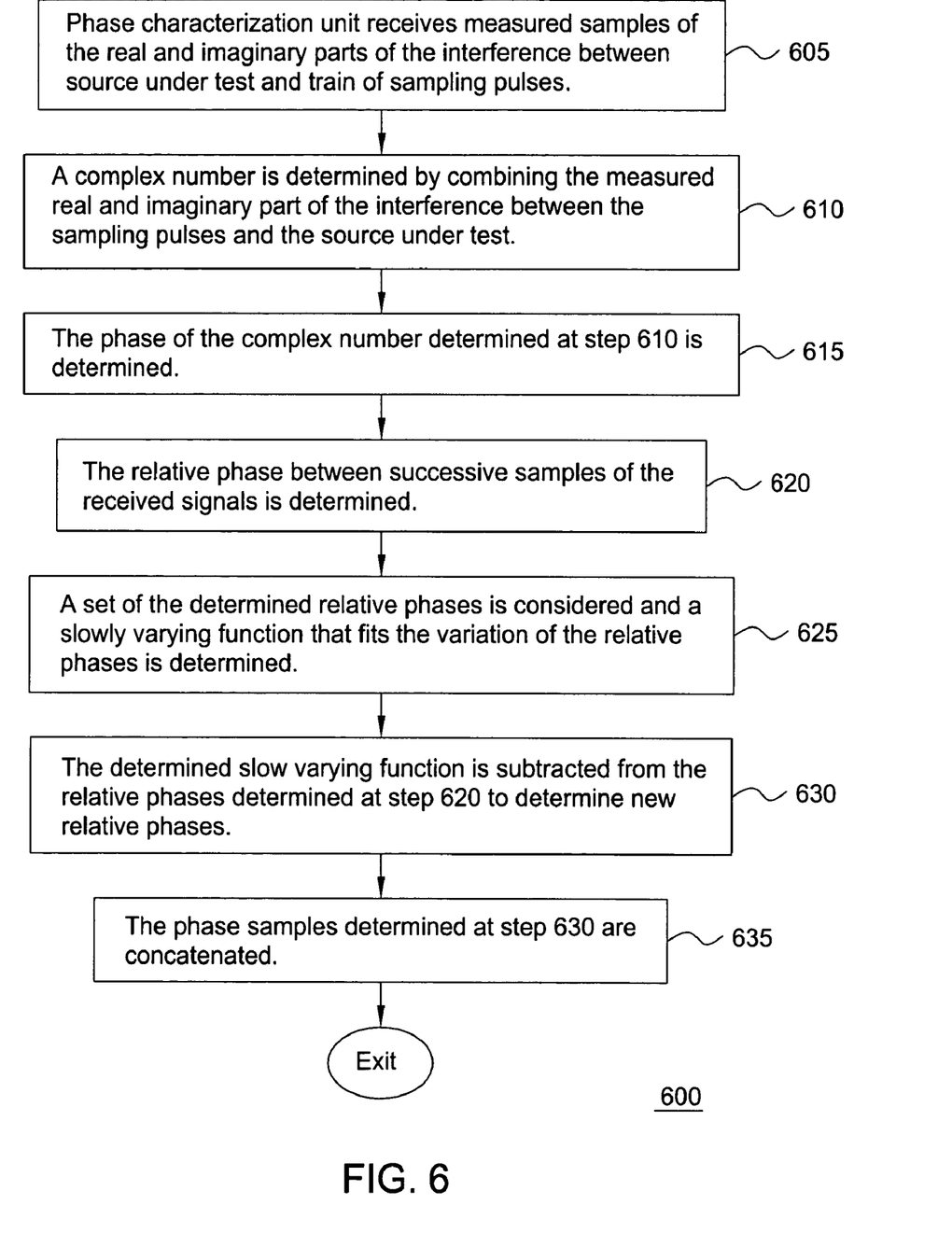
FIG. 6 depicts a flow diagram of an embodiment of a method suitable for implementation by the phase characterization unit of FIG. 4 and FIG. 5 for determining the phase characteristics of a signal under test in accordance with the present invention.

FIG. 6 depicts a flow diagram of an embodiment of a method 600 suitable for implementation by the phase characterization unit 450 of FIG. 4 and FIG. 5 for determining the phase characteristics of a source signal under test in accordance with the present invention. The method 600 of FIG. 6 is entered at step 605 wherein the phase characterization unit 450 receives the measured samples of the two quadratures (e.g., the real and the imaginary part) of the interference between the source under test and the train of sample pulses. The method 600 then proceeds to step 610.

At step 610, the method 600 determines a complex number by combining the measured real and imaginary part of the interference between the sampling pulses and the source under test. The method 600 then proceeds to step 615.

At step 615, the method 600 determines the phase of the complex number determined at step 610. The method 600 then proceeds to step 620.

At step 620, the method 600 determines the relative phases between successive samples of the received signal. The method 600 then proceeds to step 625.

At step 625, the method 600 considers a set of the obtained relative phases, and determines a slowly varying function (for example, a polynomial) that fits the variation of the relative phases. The method 600 then proceeds to step 630.

At step 630, the method 600 subtracts the determined slow varying function (e.g., a polynomial) from the relative phases determined at step 620 to determine new relative phases. The method 600 may then proceed to optional step 635 or may exit.

At step 635, the phase samples determined at step 630 are concatenated. The method 600 is then exited.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method for phase characterization of an optical signal under test, comprising:
   combining the optical signal under test with at least two pulses of a sequence of optical pulses; and
   measuring at least the real and imaginary part of the interference of the optical signal under test with said sequence of optical pulses for each of said at least two optical pulses to determine the phase characteristics of the optical signal under test.

2. The method of claim 1, wherein said combining comprises:
   for each pulse of said at least two optical pulses of said sequence of optical pulses:
   splitting said optical signal under test;
   splitting said sequence of optical pulses;
   in a first path, combining said optical signal under test and said sequence of optical pulses; and
   in a second path, combining said optical signal under test and said sequence of optical pulses, wherein a relative 90 degree phase shift is imparted between said optical signal under test and said sequence of optical pulses in said second path.

3. The method of claim 1, wherein said measuring comprises:
   for each pulse of said at least two optical pulses of said sequence of optical pulses:
   in a first path, splitting said combined signals and separately measuring the energy of each of the split signals;
   determining the difference between the measured energies of said split signals in said first path;
   in a second path, splitting said combined signals and separately measuring the energy of each of the split signals, wherein a relative 90 degree phase shift is imparted between the combined optical signal under test and the sequence of optical pulses in the second path; and
   determining the difference between the measured energies of said split signals in said second path.

4. The method of claim 3, wherein the phase characteristics of said optical signal under test are determined by a method comprising the steps of:
   a) for each pulse of said at least two optical pulses of said sequence of optical pulses, combining the determined differences in said first path and said second path to obtain a complex number;
   b) considering a subset of said complex numbers; and
   c) determining a function of said complex numbers.

5. The method of claim 3, wherein the phase characteristics of said optical signal under test are determined by a method comprising the steps of:
   a) for each pulse of said at least two optical pulses of said sequence of optical pulses, combining the determined differences in said first path and said second path to obtain a complex number;
   b) determining the phase of said complex number for each of said pulses;
   c) determining relative phases between successive determined complex numbers;
   d) determining a slow varying function representative of the determined relative phases between successive determined complex numbers; and e) subtracting said slow varying function from said phases determined in step c) to obtain new relative phase samples.

6. The method of claim 5, wherein said method for determining the phase characteristics of said optical signal under test further comprises the step of:

f) concatenating said new relative phase samples.

7. The method of claim 5, wherein said slow varying function comprises a polynomial fit.

8. An apparatus for phase characterization of an optical signal under test, comprising:

a means for combining the optical signal under test with at least two pulses of a sequence of optical pulses;

a means for measuring at least the real and imaginary part of the interference of the optical signal under test with said sequence of optical pulses for each of said at least two optical pulses; and a means for receiving the measurements from said measuring means and determining the phase characteristics of the optical signal under test.

9. The apparatus of claim 8, further comprising a means for providing said sequence of optical pulses.

10. The apparatus of claim 8, further comprising a means for synchronizing a sampling rate of said receiving means to the rate of the sequence of optical pulses.

11. The apparatus of claim 8, further comprising a means for filtering said sequence of optical pulses to match a spectral density of said optical signal under test.

12. An apparatus for phase characterization of an optical signal under test, comprising:

a 90 degree hybrid coupler for combining the optical signal under test with at least two pulses of a sequence of optical pulses;

at least two detectors for measuring at least two orthogonal quadratures of the interference of the optical signal under test with said sequence of optical pulses for each of said at least two optical pulses; and a phase characterization unit for receiving the measurements from said at least two detectors and determining the phase characteristics of the optical signal under test.

13. The apparatus of claim 12, wherein, for each pulse of said at least two pulses of said sequence of optical pulses, said at least two detectors further determine a difference between a measured energy of the optical signal under test and the sequence of optical pulses.

14. The apparatus of claim 12, further comprising a light source for generating said sequence of optical pulses.

15. The apparatus of claim 12, further comprising a detector and a pulser for synchronizing a sampling rate of said phase characterization unit to the rate of the sequence of optical pulses.

16. The apparatus of claim 12, wherein said 90 degree hybrid comprises a voltage controlled thermo-optic phase shifter for imparting a 90 degree phase shift between said optical signal under test and said sequence of optical pulses.

17. The apparatus of claim 12, wherein at least one of said at least two detectors comprises a balanced detector.

18. The apparatus of claim 12, wherein said phase characterization unit determines the phase characteristics of the optical signal under test by performing a method comprising the steps of:

a) for each pulse of said at least two optical pulses of said sequence of optical pulses, combining a real component and an imaginary component of the measurements of said at least two orthogonal quadratures of the interference of the optical signal under test and said sequence of optical pulses to obtain a complex number;

b) determining the phase of said complex number for each of said pulses;

c) determining relative phases between successive determined complex numbers;

d) determining a slow varying function representative of the determined relative phases between successive determined complex numbers; and e) subtracting said slow varying function from said phases determined in step c) to obtain new relative phase samples.

19. The apparatus of claim 12, wherein said 90 degree hybrid coupler imparts a 90 degree phase shift to said optical signal under test in a second path relative to a first path.

20. The apparatus of claim 12, wherein said 90 degree hybrid coupler imparts a 90 degree phase shift to said sequence of optical pulses in a second path relative to a first path.

21. The apparatus of claim 20, wherein said 90 degree phase shift is imparted using a voltage controlled thermo-optic phase shifter.

22. A computer-readable medium for storing a set of instructions, which when executed by a processor, perform a method of determining the phase characteristics of an optical signal under test combined with at least two pulses of a sequence of optical pulses, comprising:

a) for each pulse of said at least two optical pulses of said sequence of optical pulses, combining a real component and an imaginary component of an interference of the optical signal under test and said sequence of optical pulses to obtain a complex number;

b) determining the phase of said complex number for each of said pulses;

c) determining relative phases between successive determined complex numbers;

d) determining a slow varying function representative of the determined relative phases between successive determined complex numbers; and e) subtracting said slow varying function from said phases determined in step c) to obtain new relative phase samples.

* * * * *